W. A. BACON.
Sheet-Metal Pan Forming-Machines.

No. 155,060. Patented Sept. 15, 1874.

WITNESSES:
G. Mathys
Amos H. Hart

INVENTOR:
Wm. A. Bacon
BY
ATTORNEYS.

UNITED STATES PATENT OFFICE.

WILLIAM A. BACON, OF LOWELL, MASSACHUSETTS.

IMPROVEMENT IN SHEET-METAL-PAN FORMING MACHINES.

Specification forming part of Letters Patent No. 155,060, dated September 15, 1874; application filed June 22, 1874.

*To all whom it may concern:*

Be it known that I, WILLIAM A. BACON, of Lowell, in the county of Middlesex and State of Massachusetts, have invented a new and Improved Machine for Forming Sheet-Metal Pans; and I do hereby declare that the following is a full, clear, and exact description of the same, reference being had to the accompanying drawing forming a part of this specification, in which—

Figure 1:
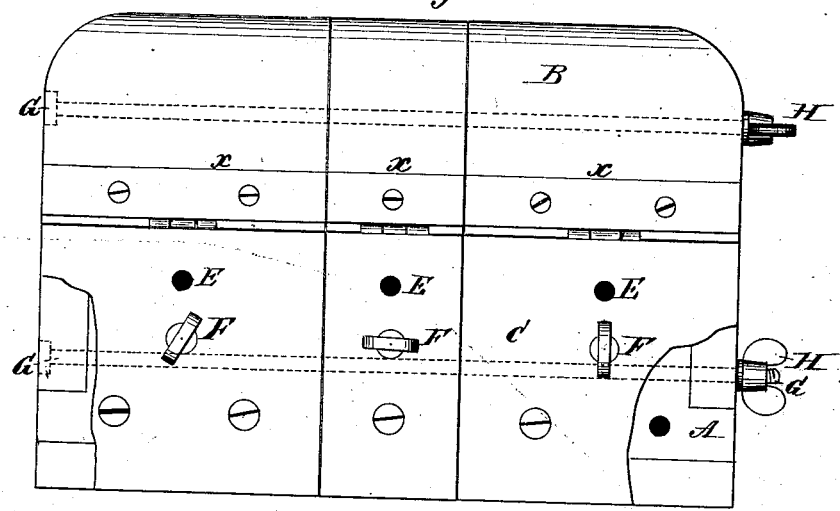
Figure 2:
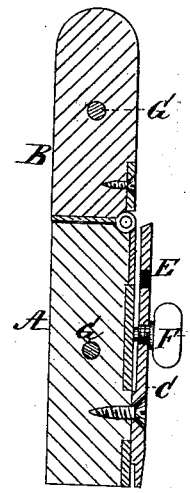

Figure 1 is mainly a front elevation, and Fig. 2 a cross-section.

The object of the invention is to provide an improved machine for bending or forming the edges of tin sheets which are intended for use in the manufacture of rectangular pans and other analogous articles of tin-ware. The improvement relates to making the hinged plates of the forming-machine in two or more sections, which are detachable one from the other to vary the length of the former according to the kind of work required to be done.

The machine is composed of three main parts, a bed-piece, A, a plate, B, hinged to its upper edge, and a plate, C, which is secured to the side of the bed-piece by means of screws, and has a rabbet, E, on its inner side. Said rabbet forms the groove into which the edges of the tin sheets are inserted vertical for bending, that operation being effected by turning the hinged forming-plate B down into a nearly horizontal position across the beveled upper edge of plate C. The function of the thumb-screws F, which pass through the plate C, so that their inner ends abut the side of the bed-piece, as shown in Fig. 2, is to regulate the depth to which the tin sheets are inserted in the groove, and thereby the width of the flange formed thereon. A series of vertical rows of holes is made in the plate C, to allow the screws F to be shifted in position according to the desired form or depth of the flange. When said screws are arranged in a diagonal line across the face of the plate C it is evident the flange formed on the sheet will be shallow at one side or edge and relatively deep on the other, as in the case of the sides of an ordinary dust-pan. The parts A B C are each made in sections, X, as shown. These sections are connected by rods G, which pass through them, and have thumb-nuts H for clamping the sections firmly together. Dowel-pins may be also employed to preserve accuracy of adjustment. Either of the end sections may be removed to make the former shorter, or by using longer tie-rods a longer section may be substituted for any of the others. Thus the former may be extended or contracted to any required size to suit different kinds of work. The bed-piece A is, in practice, secured vertical in a vise. By reversing it the shallow groove a, in its lower edge, is brought uppermost, which adapts it for use in bending the edge of pans for wiring.

What I claim is—

The bed-piece A, hinged plate B, and fixed rabbeted plate C, formed in sections x, and the tie-rods G, combined therewith, as shown and described, for the purpose specified.

WILLIAM A. BACON.

Witnesses:
CHAS. CARROLL,
ALFRED S. SAUNDERS.